No. 750,681. Patented January 26, 1904.

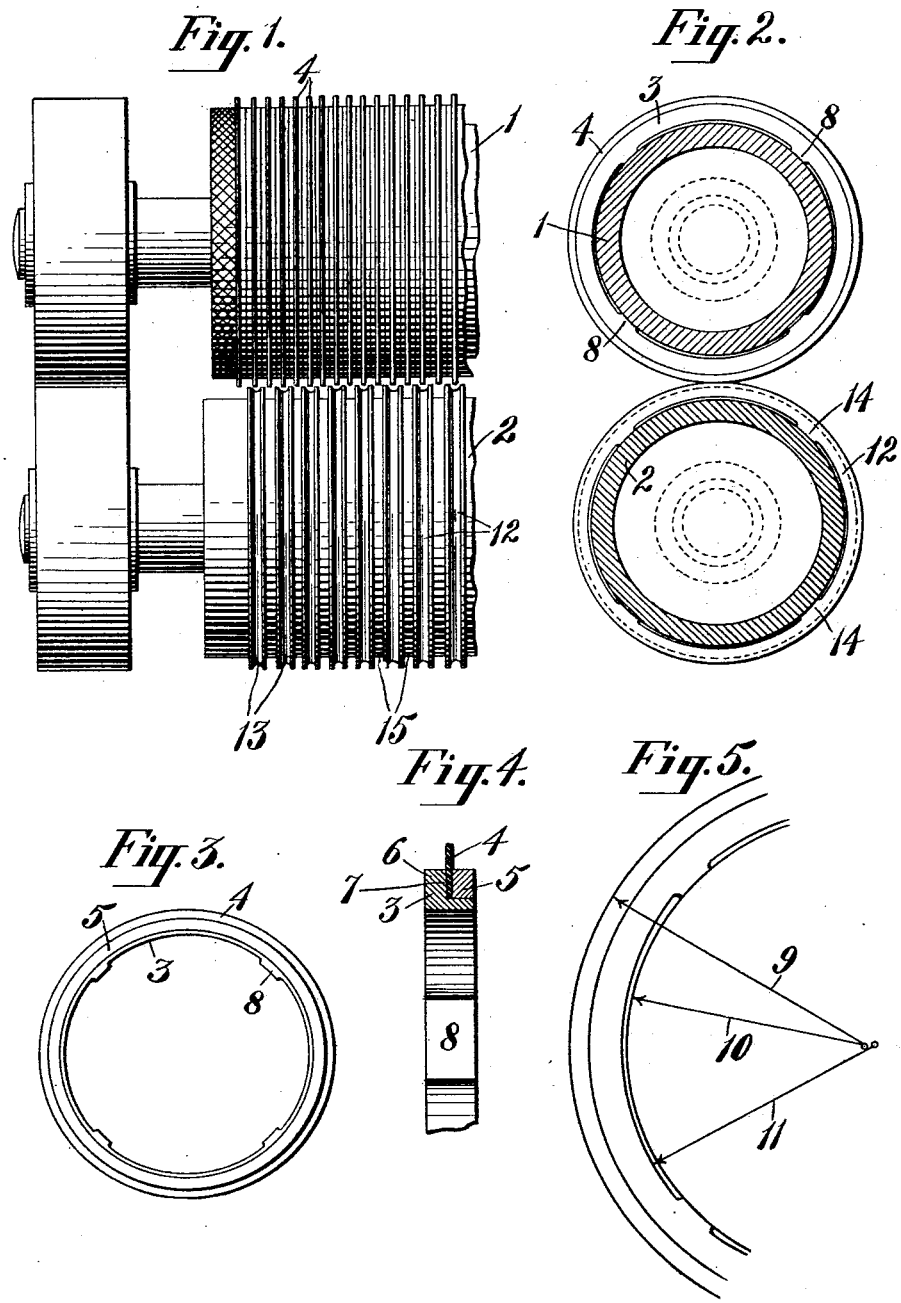

UNITED STATES PATENT OFFICE.

GEORGE F. McADAMS, OF NEW YORK, N. Y.

LINE-PRINTING MACHINE.

SPECIFICATION forming part of Letters Patent No. 750,681, dated January 26, 1904.

Application filed April 28, 1903. Serial No. 154,630. (No model.)

*To all whom it may concern:*

Be it known that I, GEORGE F. MCADAMS, a citizen of the United States, and a resident of the borough of Brooklyn, in the city and State of New York, have invented a new and useful Improvement in Line-Printing Machines, of which the following is a specification.

My invention relates to improvements in rollers for line-printing machines, the object being to provide new and improved means whereby the rings are accurately and rigidly locked upon the rollers after they have been adjusted along the rollers to the desired points. My improvement permits the use of the rings without spacing-collars between them, thus materially simplifying the method of setting up the rings and enabling the rings to be set up readily and quickly for short runs of work.

With these objects in view my invention consists of a roller comprising a shaft, rings removably mounted thereon, and lugs projecting inwardly from the rings into engagement with the shaft for springing the rings out of their normal circular shape, the peripheries of the rings being afterward trued concentric with the axis of the shaft.

A practical embodiment of my invention is represented in the accompanying drawings, in which—

Figure 1 represents a partial longitudinal elevation of a printing-disk roller and the corresponding impression-roller of a line-printing machine. Fig. 2 is a transverse section through the printing-disk roller and impression-roller. Fig. 3 is a side elevation of one of the printing-disk-roller rings. Fig. 4 is an enlarged detail cross-section through the printing-disk-roller ring, and Fig. 5 is a diagrammatic view showing the periphery of the ring trued to make it concentric with the axis of the shaft after it has been distorted by springing it onto the shaft.

The shaft of the printing-disk roller is denoted by 1, and the shaft of the foundation-roller is denoted by 2. These shafts may be made hollow, as shown herein, to decrease their weight. The printing-disk-roller rings are removably mounted upon the shaft 1 of the printing-disk roller, each of which rings is herein represented as comprising an inner ring member 3, the printing-disk ring 4, and outer ring member 5. The inner ring member 3 is provided with an outwardly-extended peripheral flange 6, forming a transverse shoulder 7. The printing-disk ring 4 is fitted snugly over the inner ring member 3 and is locked in position thereon by the outer ring member 5, which also snugly fits upon the periphery of the said inner ring member. It is to be understood that this printing-disk may be made in one piece instead of as above set forth, if so desired.

The inner ring member 3 is provided with a plurality of inwardly-projecting lugs 8. In the present instance I have shown two pairs of these lugs arranged diametrically opposite each other. These lugs are of such size that when the rings are forced onto the shaft 1 the rings will be distorted or flattened at the portions between the lugs. After the rings have been sprung onto the shaft the peripheries of the rings are trued concentric with the axis of the shaft. This is clearly shown diagrammatically in Fig. 5, in which the arrows 9 and 10 lead from the axis of the shaft to the periphery of the ring and the periphery of the shaft. The flattened inner wall of the ring is denoted by the arrow 11, leading to a center eccentric to the axis of the shaft.

The rings upon the foundation-roller are denoted by 12, and they are provided with circumferential grooves 13, which are arranged to be brought opposite certain of the printing-disk rings 4 on the printing-disk roller. Each of these rings 12 is provided with inwardly-projected lugs 14. In the present instance I have shown four of these lugs for each ring arranged in pairs diametrically opposite each other. These lugs 14 are of sufficient size to flatten or distort the portions of the ring between the lugs when the ring is sprung onto the foundation-roller 2. After the rings have been inserted into position on the shaft the peripheries of the rings are trued concentric with the axis of the shaft. These rings are preferably spaced apart along the shaft 2, so that one of the disk-rings 4 will be opposite the groove in the ring and the next succeeding disk-ring 4 will be opposite the annular groove 15 formed by the spacing of the rings apart. By this arrangement I am enabled to use half the number of foundation-roll rings before required and am also able to rule the lines much closer together than where the rings have been mounted upon the shaft in engagement with each other.

What I claim is—

1. A roller comprising a shaft, rings removably mounted thereon, and lugs projecting inwardly from the rings serving to spring the rings out of their normal circular shape on the shaft, the peripheries of the rings being afterward trued concentric with the axis of the shaft.

2. A printing-disk roller for line-printing machines comprising a shaft, line-printing rings removably mounted thereon and lugs projecting inwardly from the said rings into engagement with the shaft serving to spring the rings out of their normal circular shape, the peripheries of the rings being afterward trued concentric with the axis of the shaft.

3. A printing-disk roller for line-printing machines comprising a shaft, a ring mounted thereon comprising an inner ring member, a printing-disk ring engaged therewith and an outer ring member engaging the inner ring member and disk-ring.

4. A foundation-roller for line-printing machines comprising a shaft, rings removably mounted thereon and lugs projecting inwardly from the rings into engagement with the shaft serving to spring the rings out of their normal circular shape, the peripheries of the rings being afterward trued concentric with the axis of the shaft.

5. A foundation-roller for line-printing machines comprising a shaft, a plurality of rings removably mounted thereon and spaced apart to form annular grooves around the roller between the rings, the said rings being provided with annular peripheral grooves and also provided with lugs projecting inwardly therefrom into engagement with the shaft, said lugs serving to spring the rings out of their normal circular shape, the peripheries of the rings being afterward trued concentric with the axis of the shaft.

In testimony that I claim the foregoing as my invention I have signed my name, in presence of two witnesses, this 10th day of April, 1903.

GEORGE F. McADAMS.

Witnesses:
FREDK. HAYNES,
HENRY THIEME.